(No Model.) 2 Sheets—Sheet 1.
S. H. SHORT & J. W. NESMITH.
ELECTRIC RAILWAY.
No. 348,476. Patented Aug. 31, 1886.
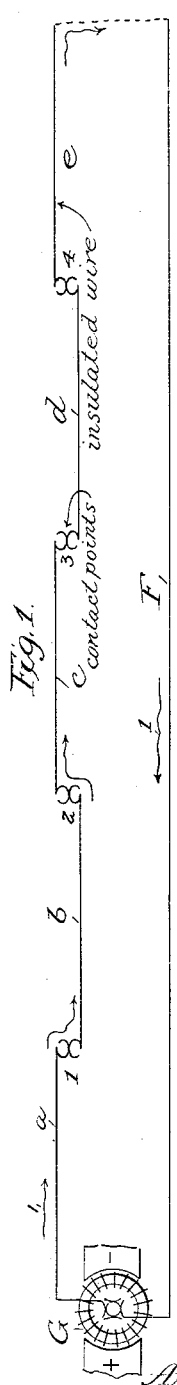
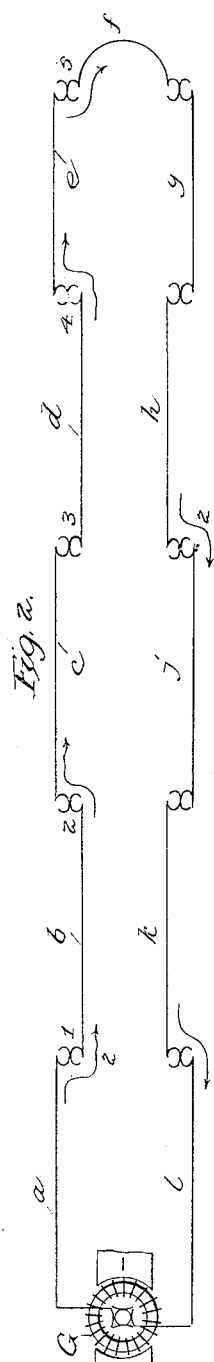
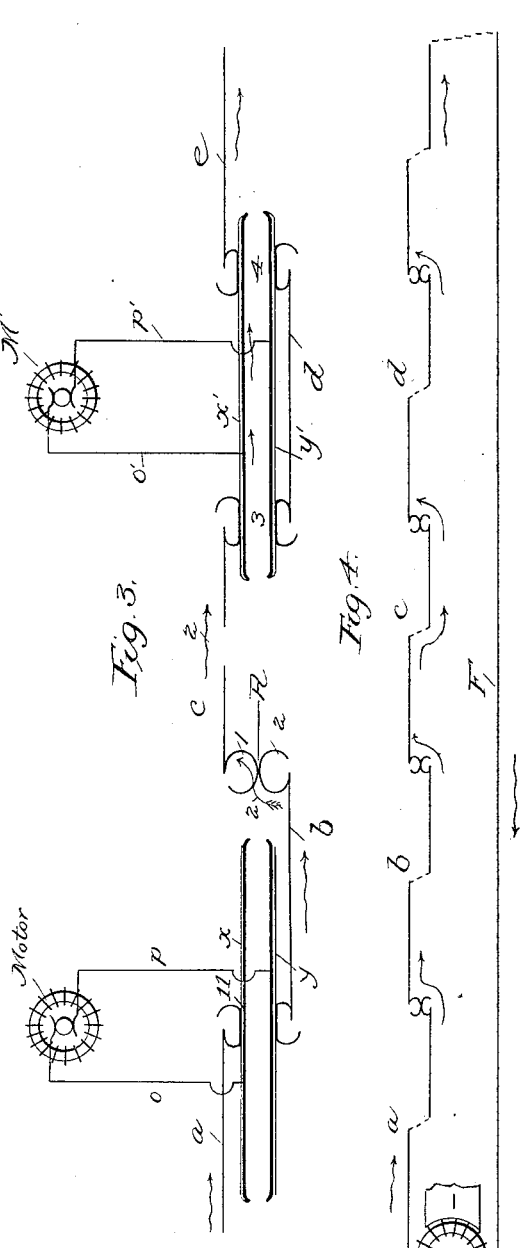
Attest:
F. L. Middleton
L. E. Middleton
Inventor
Sidney H. Short
John W. Nesmith
by Doyce & Spear
Attys

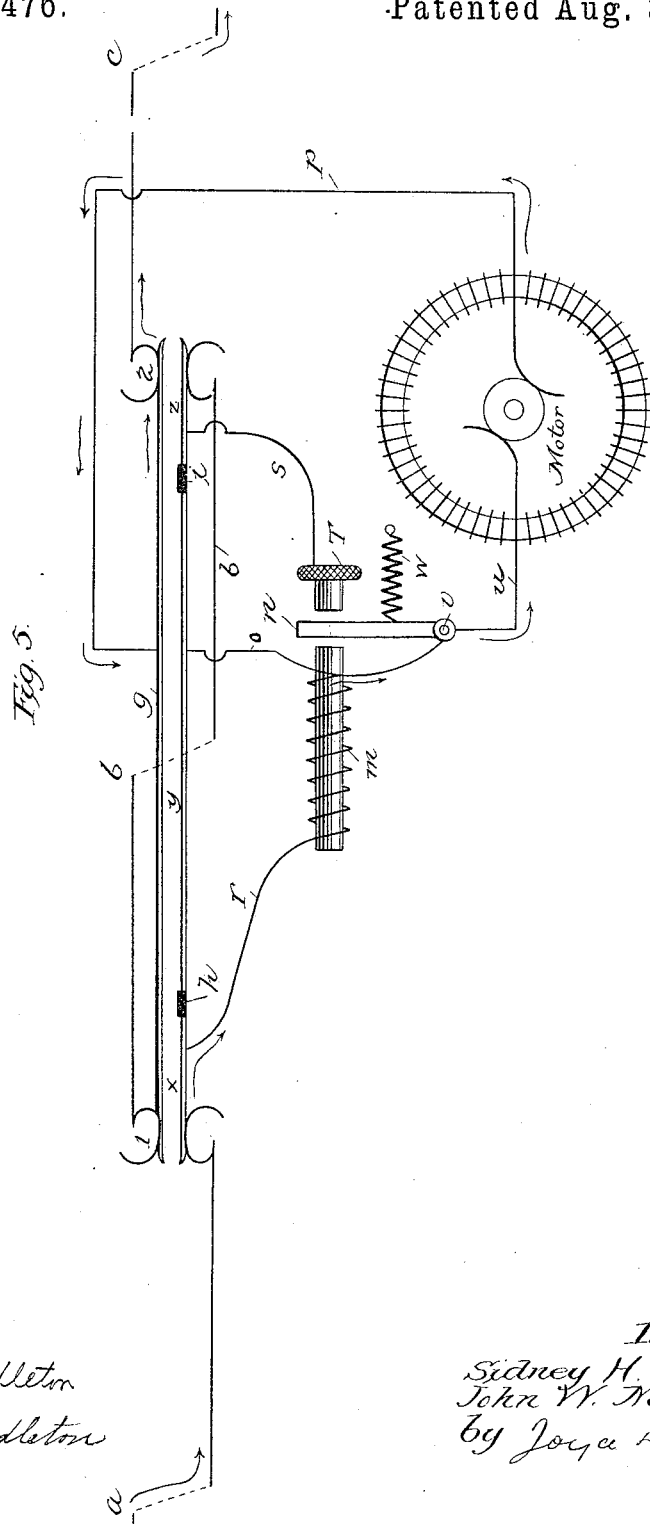

UNITED STATES PATENT OFFICE.

SIDNEY H. SHORT AND JOHN W. NESMITH, OF DENVER, COLORADO.

ELECTRIC RAILWAY.

SPECIFICATION forming part of Letters Patent No. 348,476, dated August 31, 1886.

Application filed November 27, 1885. Serial No. 184,112. (No model.)

*To all whom it may concern:*

Be it known that we, SIDNEY H. SHORT and JOHN W. NESMITH, of Denver, in the county of Arapahoe and State of Colorado, have invented a new and useful Improvement in Electric Railways; and we do hereby declare that the following is a full, clear, and exact description of the same.

Our invention relates to electric railways. In these railways, as heretofore used or devised, the conductor or conductors by which the current is supplied to the electromotor carried on the car or locomotive, has been made bare throughout its entire length, and the current is taken therefrom by brushes or gatherers passing in contact. This requires massive and expensive conductors, which are subjected to great wear. It is also liable to leakage, and in order to expose the conductors continually to the brushes, the supports and surroundings of the conductors must be of an expensive nature. We have aimed to avoid these difficulties by insulating entirely the main part of the conductor and by reducing thereon the contact-points for electrical connection with the motor on the tram-car or locomotive. We have also, by the same means or in connection therewith, provided that any number of electric locomotives may be in series and be propelled along the line in either direction without electrically interfering one with another, and that the conductor may be buried in the ground or suspended upon poles throughout the whole length of the closed circuit. We provide also that one portion of the closed circuit shall also be in such relation that persons coming in contact with one cannot by any possibility come into contact with another portion, and thereby be injured; but the main object is to dispense with the bare conductors, and our invention consists, essentially, of a line or lines of insulated wire or similar conductor in connection with a suitable track, said conductors having exposed contact parts between their sections, and operating in connection with a motor and devices for taking the current from the exposed contact-points.

In the accompanying drawings, Figure 1 is a diagram showing the conductor for single line of road with the return-wire and generator in circuit. Fig. 2 shows the conductor having a double-track railway. Fig. 3 is a diagram illustrating the mode of putting the translating-motor or electric devices into circuit on the conductor shown in Figs. 1 and 2. Fig. 4 shows a modified form of the conductor. Fig. 5 shows the device for preventing the current from short-circuiting when the insulating-bar is in contact with two sections of the conductors.

Referring to these drawings, in Fig. 1 *a*, *b*, *c*, *d*, and *e* represent the wire cut up into sections of convenient length, these sections being connected together by suitable circuit-closing devices, which normally complete the circuit through themselves from one section to the other, as shown at 1, 2, 3, and 4. The last section, *e*, is connected, as represented by the dotted line, to the return-wire F, connecting with the generator G, which is so arranged as to drive the current in the direction represented by the arrows. Where a double line of track is used, the return-wire F is cut up into sections, as shown at *f g h j k l* in Fig. 2, thus completing the circuit with the generator G, which causes a current to flow over the whole system in the direction of the arrows. Now, these sections *a b c*, &c., of insulated wires or conductors are not placed or arranged so that brushes or current-gatherers could be applied or be in contact with them, but the circuit-closers 1 2 3 4 are arranged in such a position that they are the points at which we can put an electric motor or other electric receptive device into circuit. These circuit-closers are the only places at which we can get contact with the single line of insulated conductor.

Fig. 3 shows the manner in which we put into circuit on the single-line conductor a translating motor or electric receptive device. In this *a*, *b*, *c*, *d*, and *e* represent the sections into which the single wire is cut.

The circuit-closing devices are represented simply as two uninsulated springs attached to the ends of the sections, as at 1 and 2, one spring being connected with the section *b* and the other with section *c*. When left to themselves, the springs will come automatically into contact, as 1 and 2, and the circuit will pass through them in the direction indicated by the arrows at 2. If, however, some insulating material is pushed between the springs at R, the circuit will be broken and the current can no longer pass; but if the insulating body is withdrawn they will of themselves again close the circuit. Now, if such an insulating body is made sufficiently long to reach from one of these circuit-closers to the other—that is, about the length of one of the sections of the conductor—and is provided on two sides with strips of copper or other conducting material, as shown by the lines $x$ $y$, these strips of metal can be connected by means of wires $o$ $p$ with the motor M on the car or locomotive; then, when this bar is pushed between two of the springs, as shown at 11, Fig. 3, the current will flow from the section $a$ through the spring connected with its end at 11 into the metallic strip $x$, up through the conductor $o$, attached to it, thence through the motor M back through the wire $p$ to the strip $y$, thence to the spring on the end of the section $b$, and through $b$, as shown by the arrows. The motor M is carried on any suitable car, which carries, also, the insulating body in the form of a bar having the conducting-strips $x$ $y$ on opposite sides. It is easy to understand that with the strip $x$ and $y$ this insulating-bar may be moved to the right or left without in any way disturbing the electrical continuity of the line. If it be withdrawn from between the springs at 11, they immediately close and the circuit is complete. Just before one end comes from between two of these springs, however, the other end will have entered between the pair of springs of the next circuit-breaker, as shown at 3 and 4, and the locomotive to which the bar is attached will have taken the position of M′, moving with it the strips to the position of $x'$ $y'$, with their connecting-wires $o'$ $p'$. Just at this instant, however, the current will be short-circuited through the strip $x'$, as shown by the arrows, and not pass through the wires $o'$ $p'$ and the motor M′. This would practically be a very short space of time in which the motor would be out of circuit, and it would not be objectionable for low-speed-train cars; but it might be objectionable for trains which are required to travel with high velocity.

Fig. 4 represents another method of connecting the circuit-closers. Each section of wire $a$ $b$ $c$ $d$ connects across between the contact-points from one side to the opposite side of the other circuit, which makes the current always flow in the same direction through the circuit-closers, which is somewhat better than in the first case; but either will subserve the purpose.

Fig. 5 represents the device for keeping the line from being short-circuited around the motor when the insulating-bar is in contact with two circuit-closers. Three sections, $a$ $b$ $c$, of the conductor are shown with two circuit-closers at 1 and 2, and the bar carrying the metal strips just having entered one and about to leave the other. As this is the only time that the motor could be cut out of circuit in this system, as above explained, it is here we have to provide for its remaining in circuit. If both of the copper strips were continuous, like the one $g$, then the current would flow along the section $a$, along $x$, $y$, and $z$, back through the section $b$, along the entire length $g$, out into the section $c$ of the conductor; but $x$ is interrupted and not in electrical continuity with $y$, for it is cut and an insulator put between the parts at $h$. The insulated block $i$ also separates the strip $y$ from the strip $z$. A wire, $r$, connected with $x$, allows the current from the conductor $a$ to pass to a helix, $m$, and thence by means of a wire, $u$, to the motor M, from the motor through $p$ to the strip $g$, then to the circuit-closer at 2 and out on the conductor $c$. When the current passes through the helix $m$, it draws the armature $n$ toward its core against the spring $w$, which breaks the contact between the stop $t$ and the armature $n$, which swings on the pivot $v$, and thus avoids short-circuiting the wire $s$. When the bar has passed to the left, so that the circuit-closer is to the right of $h$, no more current passes through the helix $m$, and the armature $n$ makes contact with $t$ when $y$ $z$ becomes electrically continuous through $o, m, n, t,$ and $s$. This operation is repeated by the helix every time the bar takes the position shown in the drawings, and the current can find one path only, and that through the motor.

We are aware of the patent of Cade, No. 171,350, in which a sectional conductor is devised for telegraphic connection with the train, with separable connections between the sections of the conductor and a bar carried on the train for cutting out the current and diverting it to the electric locomotive on the train, and we limit our claims to exclude this subject-matter.

We claim as our invention—

1. In combination with a railway, a conductor composed of insulated sections having uninsulated circuit-closers upon their ends arranged to be normally in contact with each other, and thus to complete the circuit through themselves, and to be separated electrically by the passage of an insulating body between their contact-points and to close automatically when the body is withdrawn, in combination with a moving electric receptive device connected to the said body, substantially as described.

2. In connection with a railway, a conductor composed of insulated sections having uninsulated circuit-closers upon their ends arranged to be normally in contact with each other, and thus to complete the circuit through themselves, and to be separated electrically by the passage of an insulating body between their contact-points and to close automatically when the body is withdrawn, in combination with an electric receptive device carried on the way and adapted to open the circuit between the sections by separating the circuit-closers, said insulating body having contact-strips thereon electrically connected with the receptive device, substantially as described.

3. In connection with a railway, a conductor composed of insulated sections having uninsulated circuit-closers upon their ends arranged to be normally in contact with each other, and thus to complete the circuit through themselves, and to be separated electrically by the passage of an insulating body between their contact-points and to close automatically when the body is withdrawn, in combination with an electric receptive device carried on the way, an insulating-bar carried therewith and having conducting-strips on its sides electrically connected with the receptive device, the said strips being adapted to bear upon the circuit-closing device while the bar is between them, and thus to divert the current, all substantially as described.

4. In connection with a railway, a conductor composed of insulated sections having uninsulated circuit-closers upon their ends arranged to be normally in contact with each other, and thus to complete the circuit through themselves, and to be separated electrically by the passage of an insulating body between their contact-points and to close automatically when the body is withdrawn, in combination with an electric receptive device carried upon the way, and an insulating-bar carried therewith adapted to pass between the circuit-closers and to separate them electrically, and proportioned in length to overlap the circuit-closers of any sections, said bar having a conducting-strip on each contact side electrically connected with the receptive device, substantially as described.

5. In an electric railway, a conductor composed of insulated sections having uninsulated circuit-closers at their ends, combined with means, substantially as described, for operating said closers and cutting out any sections and shunting the current through a moving motor, the said sections being connected across from one side to the other between the circuit-closers, whereby the current is made to flow in the same direction in every circuit-closer, substantially as described.

6. A moving electric motor or translating device, in combination with a conductor composed of insulated sections having contact ends adapted to be separated from each other and return automatically into connection, in combination with an insulating-bar carried with the motor or translating device and adapted to separate the contact-pieces of contiguous sections, the said bar having conducting-surfaces insulated from each other, one of said surfaces being continuous and the other interrupted by non-conducting sections, the said sections being connected through a helix and core and a moving armature to the translating devices or motor, substantially as described.

7. The insulating-bar adapted to pass between the uninsulated circuit-closers at the ends of the sections and separate them, made long enough to overlap the circuit-closers of any section, in combination with a continuous conducting-strip, $g$, on one side, and the strips $x\ y\ z$ on the other side interrupted at $h$ and $i$, a magnet having its helix connected with the core, its spring-operating armature connected to the strip $y$, a stop-piece connected to the strip $x$, and connections between the armature and the strip $g$, including the motor, all substantially as described.

In testimony whereof we have signed our names to this specification in the presence of two subscribing witnesses.

SIDNEY H. SHORT.
JOHN W. NESMITH.

Witnesses:
CYRUS W. FISHER,
RODNEY CURTIS.